Figure 1:
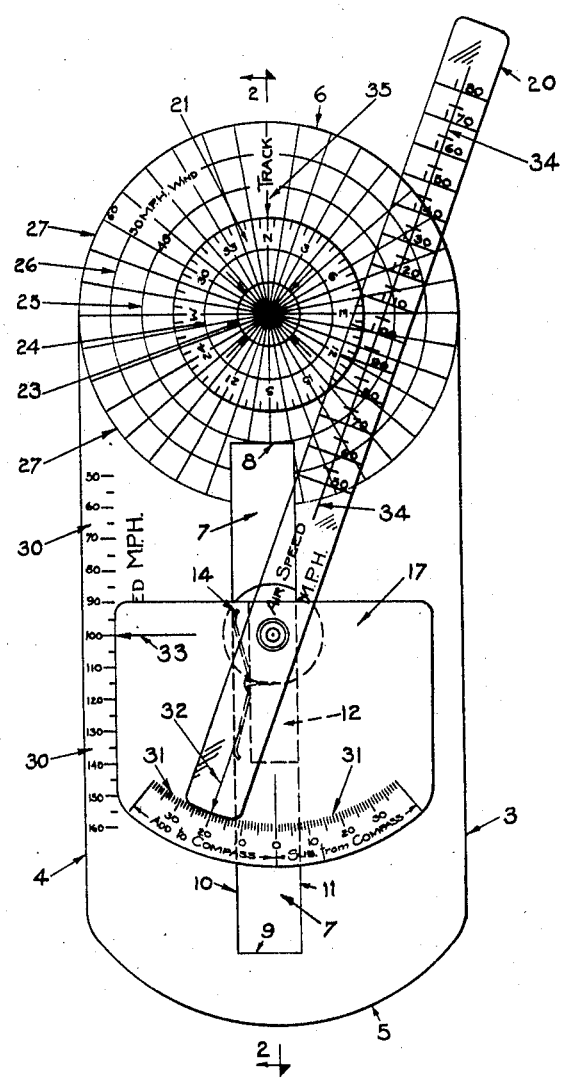

Aug. 14, 1934.  J. G. NELSON  1,969,939
NAVIGATING INSTRUMENT
Filed May 31, 1932  2 Sheets-Sheet 1

INVENTOR.
John G. Nelson
BY
Foster & Codier
ATTORNEY.

Aug. 14, 1934.    J. G. NELSON    1,969,939
NAVIGATING INSTRUMENT
Filed May 31, 1932    2 Sheets-Sheet 2

INVENTOR.
John G. Nelson
BY
Foster & Cadier
ATTORNEY.

Patented Aug. 14, 1934

1,969,939

UNITED STATES PATENT OFFICE 1,969,939

NAVIGATING INSTRUMENT

John G. Nelson, Baytown, Tex.

Application May 31, 1932, Serial No. 614,556

2 Claims. (Cl. 33—76)

This invention relates to an instrument or device for use by navigators, particularly navigators of aircraft, to enable them to determine quickly, easily and with sufficient accuracy for practical navigation certain quantities or data required for piloting or navigating a ship or aircraft.

It is a further object of the present invention to provide a device or instrument of the character herein described which may be of such small size as to be easily carried in the pocket of a garment worn by an aviator or navigator or attached to the instrument board of an aircraft, and though being of such small size, still possesses a degree of accuracy entirely sufficient for use in practical and successful navigation.

In order that the device and its use from the following detailed description may be fully appreciated, certain facts and definitions pertaining to the navigation of aircraft must be appreciated in the first instance.

If aircraft were always navigated in still air, that is when no wind was blowing, it would be sufficient merely to determine the direction of the destination from the point of departure and then navigate the aircraft in that direction from the point of departure, using a compass to maintain the course or direction, in order to reach the destination. However, the effect of the wind, both as regards its speed and the direction in which or from which it is blowing, must be taken into account in navigating aircraft, as it does not frequently occur that an aircraft is navigated in a calm or still air. If the wind is blowing parallel to the direction in which it is desired to navigate the aircraft, then the only effect of the wind would be either to increase or decrease the velocity of the aircraft according to whether the wind blows in the same direction in which the aircraft is moving under its own speed or blows in an opposite direction. If the wind, however, is blowing at any other angle, then the wind will cause the aircraft to deviate from the intended path and follow some path which represents the combined effect of the wind and the motion of the aircraft proper in the moving air (wind). Thus in navigating aircraft from one point to another, it is necessary to take into account (a) the speed of the aircraft in still air (usually called the air speed of the aircraft) and the speed and direction in which or from which the wind is blowing and to head the aircraft from the point of departure in such a direction that the resultant effect of the air speed of the ship and the wind will cause the aircraft to follow the path intended. It is among the objects of the present invention to provide a device by means of which this proper heading of the aircraft can be easily, quickly and accurately determined.

In this description the usually accepted definition of "heading" of an aircraft is adopted, which is the direction in which an aircraft is pointed, and this direction is measured in degrees from north. The usual definition of "course" of an aircraft is also adopted, which is the direction in which it is desired that the aircraft should travel, and this also is measured in degrees from north. Thus, bearing in mind the above explained considerations of the effect of wind upon the flight of aircraft, an aircraft must be so "headed" or have such a "heading" from its point of departure that it will follow the intended or desired "course" notwithstanding that wind is blowing. The wind direction herein, as is usually the practice, is given as the direction from which the wind is blowing and is measured in degrees from north.

From the foregoing it will be observed that when an aircraft is navigated when wind is blowing, the speed which the aircraft actually makes over the ground is the combined effect of the air speed of the aircraft and the speed and direction of the wind. This speed which the aircraft actually makes over the ground is called the "ground speed" of the aircraft. The "track" of an aircraft is the actual path over the ground covered by the aircraft and it is along this "track" that the ground speed of the aircraft is measured.

When wind is blowing at an angle to the course of an aircraft other than 180° or parallel thereto, the effect of the wind will require the navigator to give the aircraft such a heading to right or left of the intended course, so that after the wind has had its effect the aircraft will follow the intended course, and the angle between this "heading" and the course or track is called the "drift angle" or the "angle of drift". A further object of the present invention is to provide a device of the character described whereby a navigator may easily, quickly and accurately determine this angle of drift. A further object of the present invention is to provide a device of the character described which indicates whether the drift angle is to be added to or subtracted from the angle which the course makes with north or, what is the same, the angle which the track makes with north.

All angles herein measuring direction of wind, course, direction of track, and heading are measured clockwise in degrees from north. Angles of drift or the drift angle herein are not measured from north, but as explained above is the angular difference between the heading and the track.

In addition to providing a device which will enable a navigator of an aircraft to easily, quickly and accurately determine the drift angle, the invention has for its object the provision of a device which will enable a navigator to easily, quickly and accurately determine the ground speed of the aircraft, or in other words the speed along the track.

Ordinarily on starting a flight a navigator will know (a) the air speed of the aircraft (the speed in still air), (b) the direction and speed (velocity) of the wind, and (c) the course or direction in which it is desired that the aircraft should travel. From these three quantities, by means of the device of the present invention, the navigator can determine (1) the drift angle; (2) whether the drift angles is to be added to or subtracted from the course; (3) the ground speed or speed along the track, by a very simple manipulation of the device. Having obtained from the device the value of the drift angle and whether it should be added to or subtracted from the course, the simple mental operation of adding the drift angle algebraically to the course is all that is necessary to acquaint the navigator with the heading to be given the aircraft. Also having ascertained the ground speed of the aircraft from the device, the navigator can ascertain how long it will require to make the intended flight.

Other objects of the invention will appear obvious from the further description which follows or are pointed out specifically therein.

Figure 3:
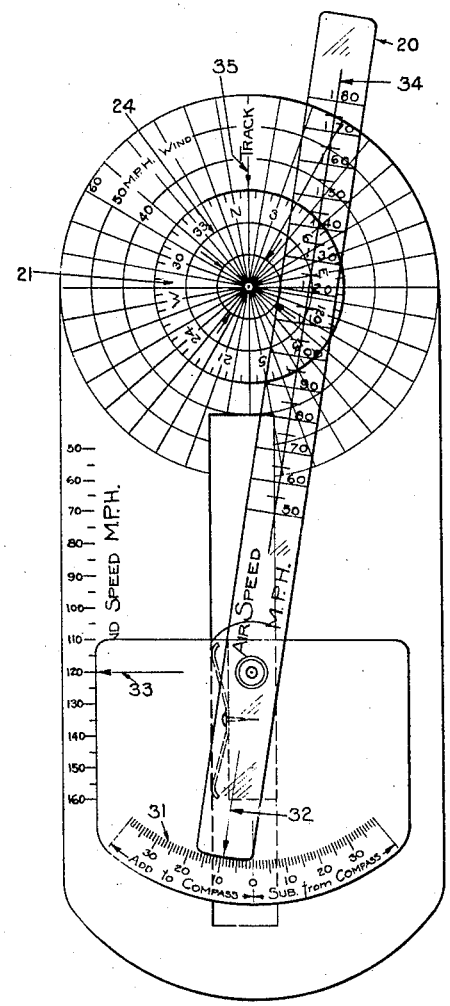
Figure 4:
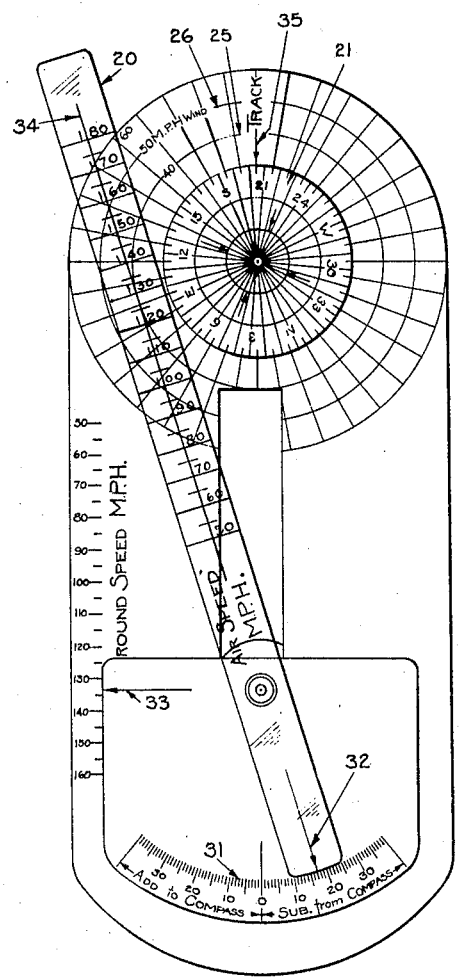

Referring to the accompanying drawings forming part hereof, and in which like numerals represent the same or corresponding parts, Figures 1, 3 and 4 are plan views of the device showing the parts thereof in different positions, each figure showing the position of the parts when the device is used to determine the drift angle and ground speed, having given the air speed of the aircraft, the direction and speed of the wind, and the track or course.

Figure 2:
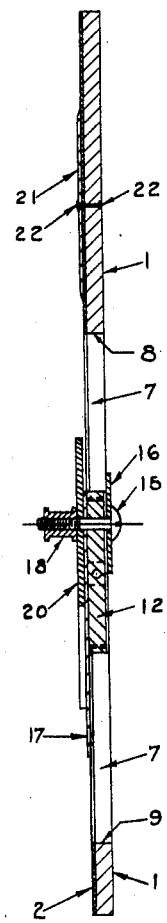

Figure 2 is a cross section of the device shown in plan in Figures 1, 3 and 4, the said cross section being taken centrally and longitudinally of the device on the line 2—2 shown in Figure 1.

The device comprises a base or plate 1 of metal or wood which may be covered with celluloid or other suitable material 2 on which or in which the graduations are made. If desired, however, this covering may be omitted and the graduations made directly on or in the base of plate 1. The base or plate 1 has preferably parallel edges 3 and 4 and arcuate ends 5 and 6, and in size may be about three inches wide and seven inches long, which size readily permits the device to be carried in the pocket of a garment worn by an aviator or navigator. Obviously the device may be made larger or smaller according to requirements of portability and accuracy.

Longitudinally of the device and parallel to the longitudinal axis of the device is provided a slot 7 which terminates short of the ends of the device at the points 8 and 9. The slot 7 has parallel edges 10 and 11. Within the slot 7 slidably moves a block 12, and a leaf spring 14 may be attached at one side of the block to force one side of the block firmly but slidably against one side of the slot 7. In the embodiment shown in the drawings, the leaf spring 14 presses against the edge 10 of the slot 7, forcing the block against the edge 11 of the slot 7.

The block 12 is held in slidable relationship on the base or plate 1 and within the slot 7 by means of screw 15, plate 16, drift angle plate or indicator 17 and nut 18. The headed screw 15 passes through the plate 16 which spans both edges of the slot 7, and thereafter the screw 15 passes through the block 12 and through the drift angle plate or indicator 17 and the nut 18 is applied to the threaded end of the screw 15. The device is also provided with a transparent scale carrying member 20 which is pivotally attached to the block 12. The member 20 may be composed of celluloid, artificial resin, regenerated viscose or other rigid non-frangible transparent material. It is preferable to pivotally attach the scale carrying member 20 to block 12 by means of the screw 15, and to this end the member 20 is provided with an opening which permits it to pivot about the screw 15. The member 20 is held in pivotal position on the screw 15 by means of the nut 18, the member 20, in the embodiment shown, being positioned between the nut 18 and the drift angle plate or indicator 17.

The drift angle plate or drift angle indicator 17, and the scale 20, being attached to the block and free of the base or plate 1, move with the block 12 as it is moved in the slot 7. The drift angle plate or drift angle indicator is firmly attached to the block 12 so that the former does not rotate about the screw 15 as a pivot as does the member 20.

The numeral 21 indicates a compass rose mounted for rotation about its center on a pin 22 secured in base or plate 1. This compass rose 21 may be made of celluloid either transparent or opaque or of metal or suitable material, and is graduated circumferentially from 0 to 360 degrees, the indications N, 3, 6, E, 12, 15, S, 21, 24, W, 30, and 33, indicating 0, 30, 60, 90, 120, 150, 180, 210, 240, 270, 300 and 330 degrees respectively, the abbreviated notation being used to simplify the indications on the compass rose 21.

The compass rose 21 is also provided with circular graduations eminating from the center thereof. Two of such circular graduations are indicated by means of the numerals 23 and 24, the center of said circular graduations being co-incident with the center of the compass rose 21. The circular outer edge of the compass rose 21 forms a third circular graduation, and thereafter the circular graduations are continued or extended outwardly on the base or plate 1 as indicated by the numerals 25, 26 and 27. All of these circular graduations have centers coincident with the center of the compass rose 21, and indicate wind speeds in miles per hour. Thus the center of the compass rose 21 indicates zero wind speed, and the circular graduations 23, 24, the circular edge of the compass rose 21, the circular graduations 25, 26 and 27 indicate respectively 10, 20, 30, 40, 50 and 60 miles per hour of wind speed.

At one side of the device parallel to the edge 11 is provided a scale 30 graduated to ground speed of the aircraft in miles per hour.

The drift angle plate or drift angle indicator 17 is provided with a scale 31 graduated to drift angles in degrees, and the legends "Add to compass" and "Sub. from compass" respectively on opposite sides of the zero of the scale indicate that the angle read on that side of the zero reading must be added to or subtracted from the azimuth of the course, or track.

The scale carrying member 20 is provided with an index 32 by means of which the drift angle is read from the scale 31; and the plate 17 is also provided with an index 33 by means of which the ground speed is read from the scale 30.

The scale carrying member 20 is provided with a scale graduated to miles per hour of air speed of the aircraft. This scale comprises a straight line 34 drawn longitudinally of the transparent member 20, and this line 34 if extended throughout the whole length of the member 20 would pass through the center of rotation of the member 20 about the pivot screw 15 and would coincide with the index 32. The graduations on the member 20 crossing the line 34 indicate air speed in miles per hour.

The device is so constructed that the center of rotation of the compass rose 21, the center of rotation of the scale on member 20 about the screw 15, and the zero graduation of the drift angle scale 31 are all in the same straight line, and the index line 33 is drawn at right angles to said straight line and at a point on the plate 17 where the index line 33, if extended, would pass through the center of rotation of the scale on the member 20 about the pivot screw 15. The instrument also is provided with an index 35 on the base or plate 1, adjacent to which is the legend "track", the said index being in the same straight line as the zero indication of the drift angle scale 31.

The graduations and construction of parts are exactly as shown in the several figures as they appear in the working embodiment of the invention believed at present to be the best mode of applying the principle of the invention, although it is to be understood that variations in the structure shown may be made without departing from the invention.

The use of the instrument or device is explained below with reference to Figures 1, 3 and 4, the said three figures representing several settings of the device with different wind velocities, track, the air speeds of aircraft.

Suppose that an aircraft is to be navigated due north from a point A to a point B, that is with a 360 degree course or track; that the air speed of the aircraft is 100 miles per hour; and that the wind is out of 100° and blowing 35 miles per hour. Given these conditions, let it be supposed that the following are required to be known: (1) the drift angle; (2) the heading of the aircraft; and (3) the ground speed of the aircraft along the track. The solution is shown in Figure 1. The compass rose 21 is rotated or adjusted until the index line corresponding to the indication N (i. e. 360 degrees) on the compass rose 21 is directly opposite the index 35 on the base or plate 1. The scale on the member 20 is then set so that the 100 mile per hour graduation of air speed on the line 34 is half way between the 30 mile per hour and 40 mile per hour circular graduation indicating wind speeds and at a point 100° east of north on the compass rose 21, as shown in Figure 1. As the 35 mile per hour wind velocity point is beyond the outer circumference of the compass rose 21, the 100° graduation of the compass rose is extended mentally on the base or plate 1 in setting the instrument as shown in Figure 1. The instrument then gives a drift angle of 20 degrees to be added to the track, and a ground speed of about 100 miles per hour. The values are obtained by merely reading the positions of the index 32 and the index 33 respectively relative to the scales 31 and 30. Thus the aircraft must be given a heading of 20 degrees east of north in navigating from the point A to the point B when a wind of 35 miles per hour is blowing out of 100° and the aircraft has an air speed of 100 miles per hour; and the speed along the track, or line connecting A and B, will be about 100 miles per hour.

Suppose now that the point B is not immediately north of the point A, but that the point B is 10 degrees east of north of the point A. That is, that the course or track is 10 degrees. Suppose further that the air speed of the aircraft is 125 miles per hour and the wind coming directly from the east, or out of 90 degrees east of north, with a speed of 20 miles per hour. The instrument or device will then give directly the drift angle and ground speed by setting it as shown in Figure 3. Referring to this figure it will be seen that the 10 degree graduation on the compass rose 21 has been set opposite the index 35 on the base 1, and the 125 mile per hour graduation on the line 34 on the member 20 has been set on the 90 degree graduation (E) of the compass rose 21 at a point corresponding to 20 miles per hour of wind speed, represented by the circular graduation 24. The instrument when so set then permits the angle of drift and the ground speed to be read directly. Referring to Figure 3 it will be seen that the index 32 indicates an angle of drift of approximately 9 degrees to be added to the track of 10 degrees to give the heading of the aircraft, i. e., a heading of 19 degrees east of north; and that the index 33 indicates a ground speed of 120 miles per hour.

Let a third example of the use of the device be considered. This is shown in Figure 4. In this example of air speed of the aircraft of about 148 miles per hour, a wind speed of 45 miles per hour coming from 125 degrees, and a course or track of 205° are assumed, and the drift angle, heading and ground speed are required to be found. The compass rose 21 is turned until the 205 degree point is opposite the index 35 on the base 1, and then the 148 miles per hour point along the line 34 on the scale member 20 is placed on the point where 125 degree graduation on the compass rose 21 if extended out radially would meet a wind speed graduation of 45 miles per hour, the latter point being halfway between the graduations 25 and 26. The setting is shown in Figure 4. As shown in Figure 4, the index 32 shows directly that the angle of drift to be subtracted from the track or course is about 17°. The heading is therefore, 205 degrees less 17 degrees or 188 degrees. The ground speed is indicated by the index 33 as about 133 miles per hour.

In the embodiment of the invention shown the circular wind speed graduations on the base or plate 1 are also intersected by radial graduations of 10 degrees each for facilitating mental extensions of the degree graduations on the compass rose 21 when necessary.

The point of the arrow index 35 beside the word "Track" on the device is in the same straight line as the center of rotation of the compass rose 21, the zero graduation of the drift angle scale 31 and the center of rotation of the scale on the member 20.

The compass rose 21 may be made larger in diameter if desired, for example, so that its outer circumferential edge is even with the end 8 of the slot 7. The slot 7 intersects the higher wind speed graduations in order to permit the block 12 to be drawn up sufficiently to accommodate the device to cases where lower air speeds, lower ground speeds, and higher wind speeds near the top of the device are involved.

From the foregoing it will be appreciated that the device involves the solutions of vector triangles in which the vector quantities are (1) air speed and heading of the aircraft, (2) ground speed and direction of track, and (3) speed and direction of the wind. The three corners or intersections of the sides of the vector triangle are at the following points: the axis of rotation of the compass rose, the pivot or axis of the scale indicating the air speed, and the selected graduation on the scale indicating air speed, which latter selected graduation as explained above is set at the point of intersection of a direction (degree) graduation and speed of wind indication on the compass rose or extensions of the said indications.

As illustrated in the foregoing examples the device is used to determine the angle of drift, the heading, and ground speed. However, the device is not limited to such use, as a skilled navigator will readily conceive of other uses. For example, a navigator, after flying a steady course from a point A finding himself over a known point B, may calculate by reference to a map his ground speed and angle of drift. Knowing these two quantities and the track between A and B, he immediately can set these quantities up on the instrument and read off wind speed and direction of the wind.

While the device is particularly designed for use by navigators of aircraft, yet it is to be understood that the device may be employed in the navigation of water crafts or ocean vessels. In using the device for water craft navigation, the wind graduations of direction and magnitude would be read as tide or current graduations, as the wind in air correspond to the tides or currents in bodies of water; the air speed graduations along the scale 20 would be read as speed of the ship in still water (patent log speed) and the group speed of the scale 30 would be read as the speed the ship makes over bottom.

The graduations of the scale 30, the graduations of the scale on the member 20, and the wind speed graduations, while shown in miles per hour, may be in any other desired units, for example, knots, or kilometers per hour. In using the device for values not within the range of the device, the units of the scales may be multiplied by any convenient factor.

I claim:

1. In a navigating instrument, a base, a rotatable compass rose pivoted thereto, said compass rose being graduated in angles and graduated outwardly in units of speed, a pivoted scale graduated in units of speed, means mounting the pivot of said scale for relative movement of said base to and from the rose, whereby when a selected indication on said pivoted scale is placed at the intersection of an angle and speed indication on said compass rose, a vector triangle is completed having its three corners defined by the axis of the compass rose, the pivot of said pivoted scale and the selected indication on said pivoted scale, a scale for indicating in terms of units of speed the velocity represented by the side of the vector triangle between the axis of rotation of said compass rose and the pivot of said scale, and means for indicating the angle between said side and the said pivoted scale.

2. A navigating instrument comprising a base, a rotatable compass rose, a pivoted scale, said compass rose being graduated in angles and graduated outwardly in units of speed, and said pivoted scale being graduated in units of speed, means attaching said rotatable compass rose and said pivoted scale to said base permitting relative movement of the pivot of said pivoted scale and the axis of rotation of said compass rose toward and from each other, whereby when a selected indication on said pivoted scale is placed at the intersection of an angle and speed indication on said compass rose, a vector triangle is completed having its three corners defined by the axis of the compass rose, the pivot of said pivoted scale and the selected indication on said pivoted scale, a scale for indicating in terms of units of speed the velocity represented by the side of the vector triangle between the axis of rotation of said compass rose and the pivot of said scale, and means for indicating the angle between said side and the said pivoted scale.

JOHN G. NELSON.